April 15, 1969     J. C. EUBANKS     3,438,077
CARWASHING APPARATUS
Filed Aug. 18, 1967     Sheet 1 of 2
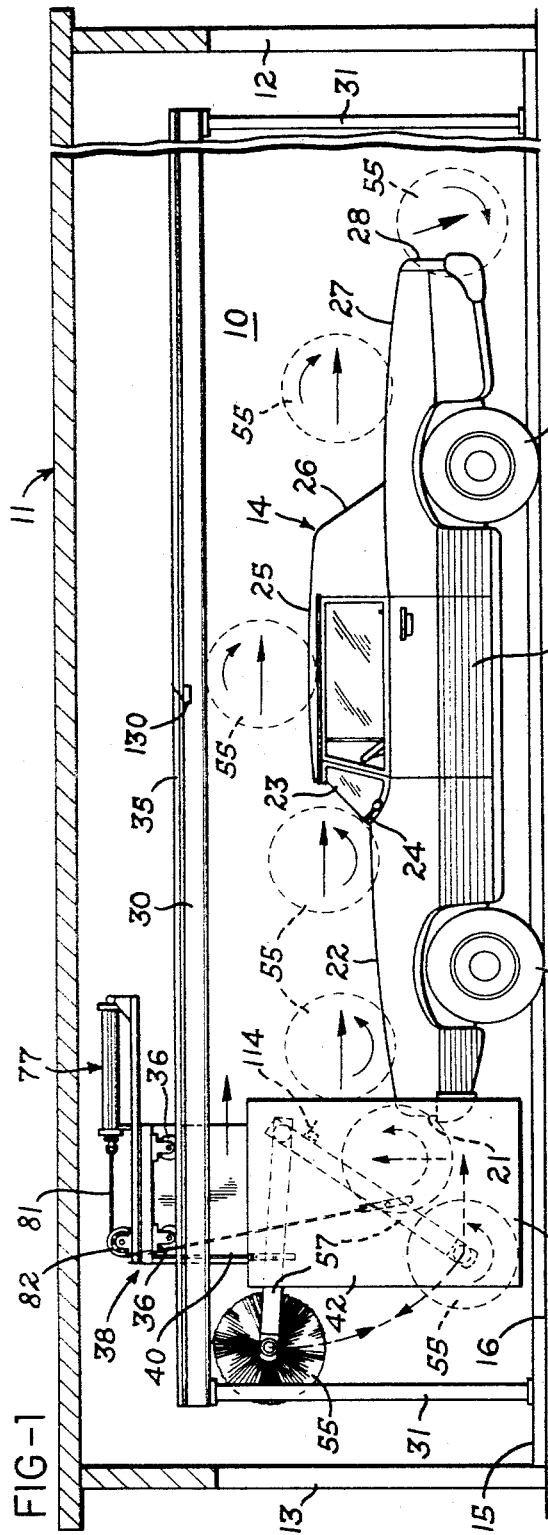
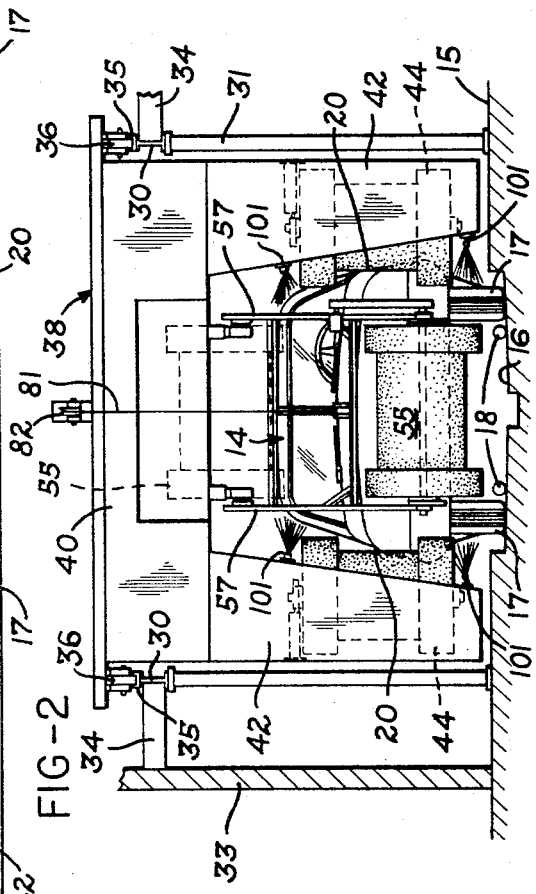
INVENTOR
JAMES C. EUBANKS
BY
Marechal, Biebel, French & Bugg
ATTORNEYS

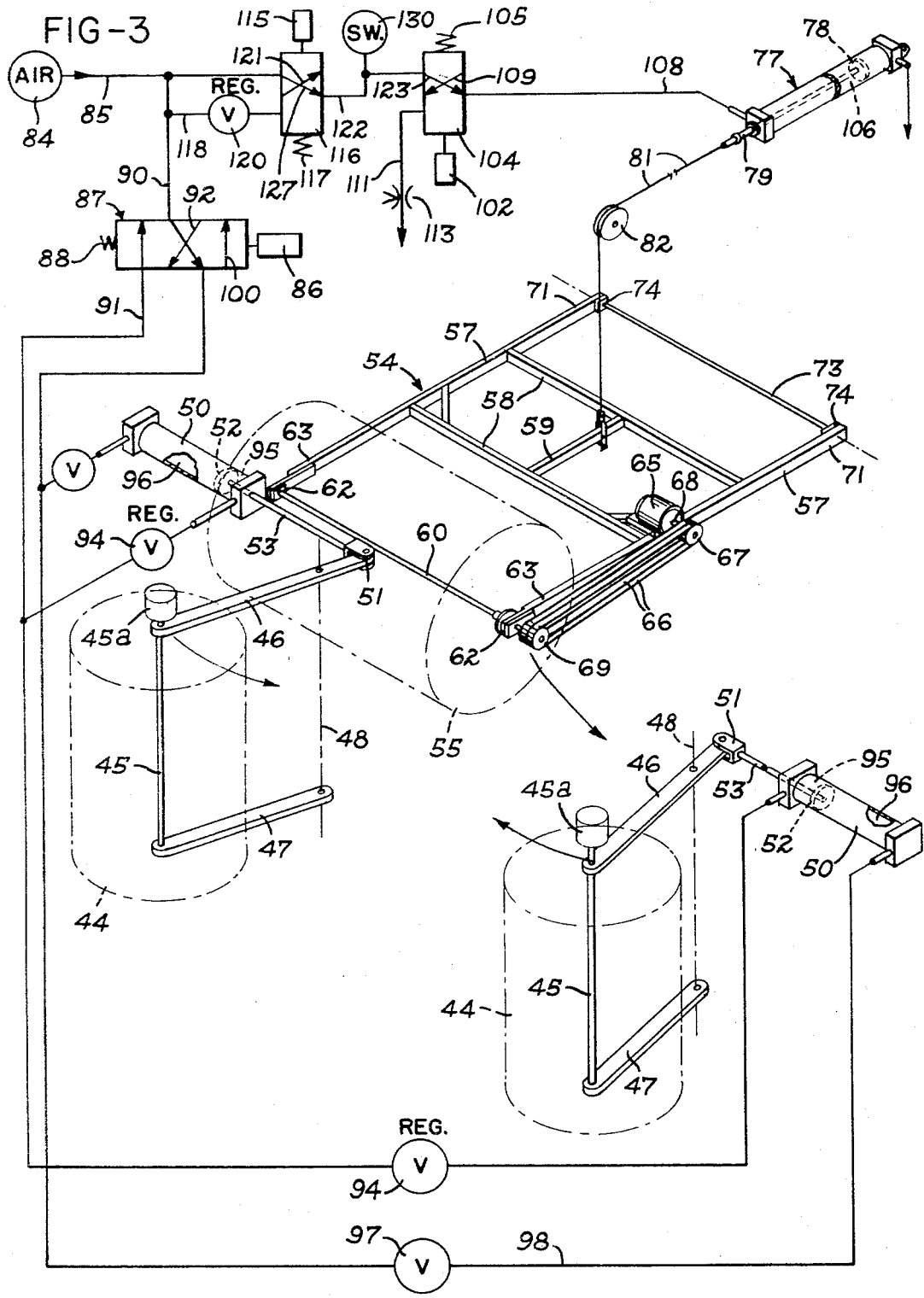

United States Patent Office 3,438,077
Patented Apr. 15, 1969

3,438,077
CARWASHING APPARATUS
James C. Eubanks, Urbana, Ohio, assignor to Century Supreme Inc., Springfield, Ohio, a corporation of Ohio
Filed Aug. 18, 1967, Ser. No. 661,585
Int. Cl. B60s 3/06; A47l 1/02
U.S. Cl. 15—21   8 Claims

ABSTRACT OF THE DISCLOSURE

An automobile washing system of the coin-operated type wherein the car is driven into a washing bay and the carwashing apparatus actuated to move along the sides and top of the car to effect the washing operation. The washing operation is performed by rotating brushes which engage the surfaces of the car, including an upper brush with an improved mounting structure which can be reversed to wash effectively all of the automobile surfaces that it contacts.

Related application

This application is related to the application of Harry R. Wagner, Ser. No. 528,571, filed Feb. 18, 1966, entitled, Washing Apparatus, both applications being assigned to the same assignee.

Background of the invention

When a rotary brush is moved sequentially into contact with the front of the automobile, the top of the hood, the windshield, the top of the car, the rear window, the trunk deck, and the rear surface of the car it is very difficult to completely clean each of these surfaces because the rotation of the brush tends to move the brush away from several of the surfaces being cleaned. Necessarily, the brush must be rotating in a direction to move the windshield wipers upwardly when the front windshield is being cleaned so that there is no damage to the wipers as would occur if the brush were tending to pull them downwardly and away from the windshield. However, when the brush is rotating in this direction it is difficult to wash the rear window and rear surface of the car, and this problem is particularly acute when cleaning a station wagon.

Moreover, the operation of the support mechanism for the top brush requires a pivotal mounting with a counterbalancing weight on the opposite end thereof so that the raising and lowering mechanism is not required to offset all of the weight of the brush. The counterweight system is heavy, and since the systems are usually manufactured in a central location and shipped to the customers it adds substantially to the cost of shipment. Moreover, it adds additional cost to the unit and consumes a substantial amount of space.

Summary of the invention

Accordingly, this invention relates to a novel car washing system wherein the top brush is automatically reversed for maximum cleaning for each of the surfaces of the automobile. Thus there is maximum cleaning of the front of the car including the front windshield without damage to the windshield wiper system, and at the same time there is maximum cleaning of the rear window and rear portion of the car since the brush automatically reverses its direction while cleaning the top of the car.

In addition, a novel balancing mechanism is provided for the top brush which includes an actuated air cylinder which raises and lowers the brush but which also acts to prohibit substantially all of the weight from resting on the automobile. This is accomplished by utilizing the piston type actuator in the conventional manner during the raising and lowering phases but automatically modifies this actuator to operate as a pressure regulated air spring when the brush is in its lowered position.

Brief description of the drawings

FIG. 1 is a side elevation view partially in section of a carwashing bay utilizing the apparatus in accordance with the invention;
FIG. 2 is an end view of the carwashing bay looking from left to right of FIG. 1; and
FIG. 3 is a schematic illustration of the air system which is utilized to operate the brushes.

Description of the preferred embodiment

Referring to the drawings wherein a preferred embodiment of the invention is shown, FIG. 1 illustrates the carwashing bay 10 formed in the building 11 having an entrance 12 and an exit 13 through which the automobile 14 is driven. The floor 15 has a depression 16 (FIG. 2) therein to accommodate the wheels 17 of the automobile 14 and the guide rods 18 are mounted rigidly in this depression to provide guideways for the wheels. The floor 15 is preferably heated so that ice cannot be formed during the winter months.

The automobile 14 may be of any standard design which includes the generally vertical side surfaces 20, the front end or surface 21, the hood 22, the front windshield 23 having the cooperating windshield wipers 24, the top 25 of the automobile, the rear window 26, the trunk deck 27, and the rear surface or end 28 of the automobile. To satisfactorily wash the automobile, it is necessary to remove the dirt from each of these surfaces as well as from the wheels 17.

Thus the carwashing apparatus includes elongated I-beams 30 supported at their opposite ends by the jack posts 31 a preset distance above the floor 15. The I-beams 30 may be braced to the side wall 33 of the building 11 by the stabilizers 34. A U-shaped channel 35 is provided on top of the I-beams 30 with the open end extending upwardly for accommodating the guide and support rollers 36 of the movable carriage 38 which reciprocates back and forth in the bay 10.

The carriage 38 includes the top and side members 40 and 42 which have no contact with the building 11 or the floor 15 other than through the rollers 36 riding in the channels 35. The side members 42 have the rotary side brushes 44 mounted thereon and adapted to swing outwardly into contact with the sides 30 of the automobile 14 during each wash cycle. The side brushes 44 are thus supported on the vertical support shaft 45 (FIG. 3) having the arms 46 and 47 secured at the opposite ends thereof and being pivotally secured to the side member by the pivot rod 48. The top arm 46 is connected to the air cylinder 50 by the coupling 51 so that, as the cylinder extends and retracts the piston 52 and piston rod 53, the brush 44 is pivoted into contact with the automobile. The side brushes 44 are driven at high speed by the motor and reduction gearing 45a connected directly to the support shaft 45 and supported on the arm 46.

Referring now to the mounting structure 54 for the top brush 55 which is supported on the top member 40, the parallel side members 57 (FIG. 3) are rigidly interconnected by the intermediate braces 58 having the central brace member 59 secured therebetween. The brush 55 is supported by an axle 60 which extends through suitable bearing members 62 on the lower end 63 of the side members 57. The drive motor and gear reduction unit 65 for the top brush 55 is secured to the intermediate brace 58 and has two endless belts 66 interconnecting the pulley 67 on the drive shaft 68 with a similar pulley 69 on the right-hand end of the axle 60. The upper ends 71 of the side members 57 are also pivotally secured to the top member 40 by the axle 73 which extends through suitable bearing members 74 (FIG. 1) and is pivotally secured in place on the top member 40.

The mounting structure 54 for the upper brush 55 is raised and lowered to engage the upper surfaces of the automobile, and this raising operation is performed by the air cylinder 77 having the piston 78 which reciprocates therein with its cooperating piston rod 79 connected to the cable 81 which extends around the pulley 82 and is connected to the intermediate brace 59. As a result, reciprocation of the piston 78 effects raising and lowering of the mounting structure 54. The air cylinder 50 also serves as a counterbalancing mechanism for the brush 55 and structure 54, and the operation thereof can best be described in connection with the operation of the entire assembly.

Accordingly, when the carwashing apparatus is to be utilized, the automobile 14 is driven into the bay 10 and the driver retracts the antenna and closes all of the windows of the automobile. A preset number of coins are placed in the coin box which actuates the automatic control system causing the carwashing cycle to commence. The air pump 84 is then started supplying high pressure air through the line 85. Specifically, the drive mechanism causes the carriage 38 to move along the channels 35 in one direction with the brushes rotating and in contact with the automobile. The carriage 38 then returns with the top brush retracted and the side brushes still engaging the automobile while rinse water is being sprayed onto the automobile.

At the same time, the solenoid 86 is energized to shift the three-way valve 87 to the left against the bias of the spring 88, as shown in FIG. 3, so that the lines 90 and 91 are interconnected through the valve passage 92, and the high pressure air flows through the regulator valves 94 into the chambers 95 of the cylinders 50 which move the side brushes 44. The other chambers 96 are connected to the atmosphere through the valves 97, the line 98, and the passages 100 in the valve 87. This causes the pistons 52 to be retracted with consequent movement of the arms 46 and 47 about the pivot 48 so that the side brushes 44 are advanced into position against the sides 20 of the automobile 14. At the same time, the brushes are rotated at high speed by the motors 45a, and the water-detergent mixture is being sprayed onto the brushes and the automobile through the numerous nozzles 101 (FIG. 2). The detergent system is described fully in the aforesaid copending application.

The regulator valves 94 limit the pressure within the chamber 95 on each of the actuators 50 so that the side brushes 44 are urged lightly against the sides 20 of the automobile 14. Any obstructions which are encountered on the sides will cause the brushes to ride over them since the actuator 50 will absorb these movements. At the same time that the cycle is started, the solenoid 102 is energized to move the three-way valve 104 against the bias of the spring 105 so that air in the chamber 106 of the actuator 77 for the top brush 55 is evacuated through the line 108, the passage 109 in the valve 104, and the outlet vent 111. A variable restriction 113 is provided in the outlet vent 111 so that the rate that the air is discharged from the cylinder can be carefully controlled so that the brush 55 does not drop abruptly. The weight of the top brush assembly 54 causes it to pivot about the axis 73 to the lowered position since the air pressure is no longer applied to the chamber 106 of the actuator 77.

When the brush 55 reaches its lowered position, it trips the limit switch 114 (FIG. 1) causing the solenoid 115 to be energized to force the three-way valve 116 against the bias of the spring 117 to a position wherein the line 118 having the regulator valve 120 therein connects the air pressure line 85 through the passage 121 in the valve 112, line 122, passage 123 in the valve 104 whose solenoid 102 was deenergized by the switch 114, the line 108, and into the chamber 106 of the actuator 77. As a result, a small amount of pressure is supplied to the chamber 106 of the actuator 77 to offset substantially all of the weight of the top brush 55 and its support assembly 54. Thus, as the brush 55 engages the surfaces of the automobile but does not exert any substantial force, it forces the assembly upwardly and allows the brush 55 to ride over all projections or obstructions without damage. The regulator valve 120 must be carefully adjusted and correlated with the weight of the structure 54 and the brush 55 so that the pressure created thereby in the chamber 106 effectively offsets all but a small amount of this weight so the brush 55 rides over the surfaces 21–28 of the automobile 14.

When the washing cycle is completed, the solenoid 86 is deenergized, causing the three-way valve 87 to be shifted to the left connecting the pressure line 85 with the line 98 which are connected to the retract chambers 96 of each of the side cylinders 50. The pistons 52 are then extended causing the arms 46 and 47 to be pivoted about the axis 48 to retract the brushes 44 into the side assemblies 42. At the same time, the solenoid 115 is also deenergized causing the spring 117 to move the valve upwardly to connect, through the valve passage 127, the full force of the air pressure to the line 122 and 108 to the chamber 106 of the actuator 77. This action moves the piston 78 rearwardly causing the piston rod 79 to be withdrawn into the cylinder and the cable 81 to be moved upwardly around the pulley 82 to raise the entire top brush assembly 54. After the brush 55 reaches the raised position, and the brushes 44 their retracted position, they remain in these positions until the next cycle.

The pressure switch 130 in line 122 at all times senses the pressure within this line so that if the pressure fails for any reason, the solenoid 102 is deenergized so that the brush 55 is slowly lowered as the air is vented through the restriction 113. This arrangement prohibits the brush 55 from ever falling onto any person or automobile.

As the carriage 38 moves along the channels 35 above the automobile 14, a limit switch 130 positioned above the top surface 25 of the automobile 14 is engaged causing the appropriate controls to change the direction of rotation of the drive motor 65 for the top brush 55 thus reversing direction of rotation of the brush 55. This enables the brush 55 to rotate in a counter clockwise direction, as viewed in FIG. 1, as it passes over the front 21, the hood 22, and the windshield 23 of the automobile for efficient cleaning of the front 21 and windshield 23 as well as for protection of the windshield wipers 24 which may be forced upwardly to a position wherein the brush 55 cannot damage them.

When the brush 55 is in engagement with the top surface 25 the direction of rotation thereof is immaterial as far as the cleaning operation is concerned so that reversing of the brush at this point in no way affects the cleaning operation. As the brush 55 pulls itself downwardly on the rear window 26 and the rear surface 28 of the automobile by reason of the clockwise rotation the brush efficiently cleans these surfaces. Especially, when a station wagon is being washed, the clockwise rotation of the brush works very effectively on the substantially vertical rear window and rear surface thereof since the portion of the brush in contact with the automobile is moving in a direction opposite to the direction of movement of the entire brush.

Accordingly, applicant has provided an improved carwashing appartus wherein an improved pneumatic system is provided for actuating the top and side brushes while the actuator for the top brush also acting as a counterbalancing mechanism for the weight of the top brush assembly. This reduces the weight and cost of the system as well as the space consumed thereby. Also, the reversing of the top brush during the central portion of the washing cycle permits more efficient and effective cleaning of the various surfaces of the automobile without damage to the windshield wipers.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Carwashing apparatus including a reciprocable carraige mounted for movement along a predetermined path to wash an automobile parked in such path, said apparatus comprising a top brush mounting assembly secured to said carriage for reciprocation therewith, said mounting assembly including a rectangular bracket pivotally secured at one end to the carriage for movement between a raised position and a lowered position, a rotatable brush mounted on the opposite end of said bracket and adapted to contact the front, top, and hear surface of the automobile when said bracket is in said lowered position, means for rotating said brush at high speed, an air actuator having a piston reciprocably mounted therein and having a piston rod secured to said piston, means connecting said piston rod to said bracket, air supply means for supplying air under a first pressure to one chamber of said actuator to move said bracket to said raised position, and valve means operable when said bracket is in said lowered position to supply a second lower pressure to said one chamber to enable said piston and said piston rod to apply a force to said bracket sufficient to almost counterbalance the weight which tends to move said bracket to said lowered position thereby prohibiting damage to the automobile from the weight of said mounting assembly.

2. Carwashing apparatus as defined in claim 1 wherein said brush is lowered by the force of gravity, said valve means connecting said actuator to a restriction through which air is slowly vented to permit gravity to move said brush to said lowered position thereby prohibiting abrupt downward movement of the brush, and means for automatically shifting said valve means to connect said restriction with said actuator when said brush is to be lowered.

3. Carwashing apparatus as defined in claim 1 wherein a pair of side brushes are rotatably mounted on said carriage for engaging the side surfaces of the automobile, second valve means for controlling the movement of said brushes between an advanced position wherein they engage said automobile and a retracted position, third valve means for modifying the pressure supplied to said actuator to reduce the force applied by said side brushes when in said extended position so that only a slight amount of pressure is applied to the automobile to prohibit damage thereto.

4. Carwashing apparatus as defined in claim 1 wherein said air actuator is mounted above said rectangular bracket and has a cable connecting the piston rod thereof to an intermediate portion of said bracket for raising and lowering said bracket.

5. Carwashing apparatus adapted to clean the front windshield, the top surfaces, and the rear surfaces of an automobile comprising, a reciprocable carriage mounted for movement along a predetermined path to wash the automobile when parked in said path, a top brush mounted on said carriage for reciprocation therewith, a mounting assembly for said top brush for moving the same from a raised position to a lowered position where the brush engages the surfaces of the automobile, drive means for rotating said brush in one direction as it engages the front windshield so that the portion of said brush in contact with the windshield is moving in an upward direction and for automatically reversing the direction of rotation of said brush while said brush is engaging the top surface of the automobile thereby permitting said brush to clean effectively the rear surfaces of the automobile since the portion of the brush in contact with the rear surface is moving upwardly while the brush as a unit is moving in the opposite direction.

6. Carwashing apparatus as defined in claim 5 wherein two parallel guide members are mounted on either side of said predetermined path a substantial distance above the floor, and means on said carriage for moving said carriage along said parallel members and for supporting said carriage thereon without contact with the floor.

7. Carwashing apparatus as defined in claim 6 wherein said drive means includes a switch mechanism on at least one of said members so that as the carriage passes over the central portion of an automobile the direction of rotation of said drive means and said top brush is reversed.

8. Carwashing apparatus as defined in claim 5 wherein said mounting assembly includes a rectangular bracket pivotally secured at one end to the carriage for movement between a raised position and a lowered position, an air actuator having a piston reciprocably mounted therein and having a piston rod secured to said piston, means connecting said piston rod to said bracket, air supply means for supplying air under a first pressure to one chamber of said actuator to said bracket to said raised position, and valve means operable when said bracket is in said lowered position to supply a second lower pressure to said one chamber to enable said piston rod to apply a force to said bracket sufficient to almost counterbalance the weight which tends to move said bracket to said lowered position thereby prohibiting damage to the automobile from the weight of said mounting assembly.

References Cited

UNITED STATES PATENTS 3,300,803   1/1967   Seakan.

FOREIGN PATENTS 1,196,147   11/1959   France.
  885,104   12/1961   Great Britain.

EDWARD L. ROBERTS, *Primary Examiner.*